UNITED STATES PATENT OFFICE.

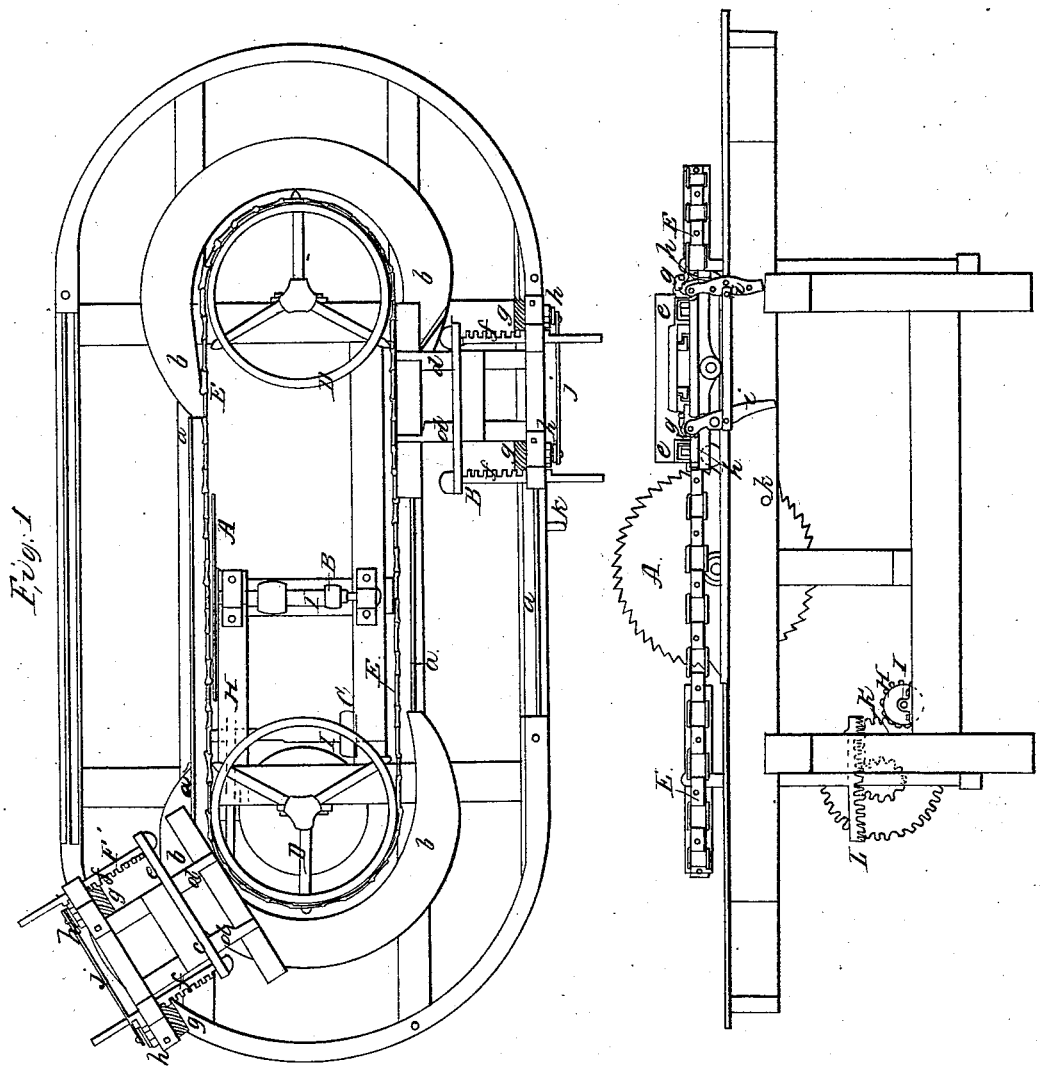
G. L. Day,
Sawing Shingles.
No. 2,942.   Patented Feb. 4, 1843.

GEO. L. DAY, OF UNION, NEW YORK.

MANNER OF CONSTRUCTING MACHINES FOR SAWING SHINGLES.

Specification of Letters Patent No. 2,942, dated February 4, 1843.

*To all whom it may concern:*

Be it known that I, GEORGE L. DAY, of Union, in the county of Broome and State of New York, have invented a new and Improved Manner of Constructing a Machine for the Sawing of Shingles, which Machine I denominate the "Polycarriage Shingle-Machine;" and I do hereby declare that the following is a full and exact description thereof.

In my machine, the shingles are to be cut by means of a circular saw, and the bolts, or blocks, from which they are to be cut, are placed upon suitable carriages, of which there may be six, or eight, in numbers, more or less, all of which are attached to an endless chain that passes around suitable band or chain wheels; which wheels, being made to revolve by any adequate power, cause the carriages, with the stuff thereon, to pass in succession in a line with the saw, in such manner as that it shall cut a shingle from each block, or bolt. The carriages are sustained upon a horizontal table, and the stuff upon each of them is set by a self-acting apparatus, so as to cut a butt and a point in succession from each bolt.

In the accompanying drawing, Figure 1, is a top view of my machine, and Fig. 2, a side elevation thereof. I have in Fig. 1, represented two carriages only, but in the actual machine I have employed eight. A, is the circular saw, which may be driven by a band passing around the pulley B, there being a corresponding pulley C, on the main driving shaft. D, D, are the band, or chain wheels around which the endless chain E, E, passes. F, F', are two of the carriages, one of which, F, is just approaching the setting pin, and the other, F', is passing around one of the circular ends of the horizontal table. The carriages F, F', are each attached to the endless chain by a single bolt only, so that they may assume the position shown at F', in passing around the band wheels. They are each provided with grooved rollers which run upon suitable ways; these ways consist, in the straight part of the table, of edge rails $a$, $a$, which are turned up so as to enter the grooves in the carriage wheels; but in their curved part, as at $b$, $b$, they consist of flat plates, as the position of the carriages, when passing around these parts, does not admit of the edge rails entering the grooves readily, nor does their action require it. $c$, are guides which serve to conduct the carriages from the circular ends on to the edge rails.

Different kinds of self-setting carriages may be used for feeding the stuff to the saw, and for determining the cutting of a butt and a point alternately. That which is represented in the drawing, is substantially the same in its operation with others which have been previously used; I will, therefore, only give a general description of it, as I do not claim it as of my invention. The bolts are to rest on the supports $d$, $d$, of the carriage, and are to be held in place against the sliding plate $e$, $e$, by dogs of any of the kinds now in use for that purpose, and which may be adapted thereto; $f$, $f$, are two racks attached to the sliding plate $e$, $e$, by joint pins; $g$, $g$, are feeding worm wheels that are affixed to shafts having, at their outer ends, the ratchet wheels $h$, $h$; these ratchet wheels are furnished with teeth alternately long and short, corresponding with the butts and points of the shingles; $i$, $i'$, are jointed levers connected together by the bar $j$; each of the levers $i$, $i'$, is furnished with a pawl, or click, which engages with the teeth of the ratchets $h$, $h$; $k$, is a pin on the frame of the machine with which the levers $i$, on the respective carriages, are brought into contact as they pass around; and by this action, the stuff is set for a head and a point at each end alternately.

The gearing for driving the saw and the chain wheels may be arranged in various ways; that which I have used is represented in the drawing, and is as follows. $H$, is a small spur wheel on the main driving shaft I, and this gears into a spur wheel, or pinion, K, which gears into a crown wheel L, on the shaft of one of the chain wheels. Said chain wheels are furnished with teeth, or pins, that engage with the links of the endless chain. The saw is driven by a band and whirls as already described.

In using this machine, a continuous motion of the carriages, and of the saw, is to be kept up, new butts, or bolts, being supplied to the carriages by the attendants, while they are in motion, ample time being allowed for this purpose from the number of carriages employed, all of which are to supply a single saw. It will be manifest, that by means of a machine of this construction, a greater number of shingles may be cut in a given time by a single saw than can be effected by any arrangement previously known, the carriages being placed as close to each other as their use will conveniently admit.

Having thus fully described the nature of my improvements in the machine for sawing shingles by means of a circular saw, what I claim therein as new, and desire to secure by Letters Patent, is—

The manner herein set forth in which I have combined a series of carriages adapted to the receiving and setting of blocks, or bolts, from which shingles are to be cut, with an endless chain and a circular saw; said carriages being attached to the endless chain, and being carried round upon a horizontal table, so as in succession, to present a suitable block, or bolt, to the saw; said horizontal table being furnished with ways, and the whole apparatus being constructed, arranged, and operating, substantially in the manner herein set forth.

GEORGE L. DAY.

Witnesses:
 THOS. P. JONES,
 M. E. JONES.